US009315192B1

(12) United States Patent
Zhu et al.

(10) Patent No.: US 9,315,192 B1
(45) Date of Patent: Apr. 19, 2016

(54) METHODS AND SYSTEMS FOR PEDESTRIAN AVOIDANCE USING LIDAR

(71) Applicant: Google Inc., Mountain View, CA (US)

(72) Inventors: Jiajun Zhu, Mountain View, CA (US); Peter Morton, Mountain View, CA (US)

(73) Assignee: Google Inc., Mountain View, CA (US)

(*) Notice: Subject to any disclaimer, the term of this patent is extended or adjusted under 35 U.S.C. 154(b) by 59 days.

(21) Appl. No.: 14/041,121

(22) Filed: Sep. 30, 2013

(51) Int. Cl.
*G08G 1/00* (2006.01)
*B60W 30/18* (2012.01)
*G06K 9/62* (2006.01)
*G06T 11/00* (2006.01)
*G05D 1/02* (2006.01)

(52) U.S. Cl.
CPC ............. *B60W 30/18* (2013.01); *G05D 1/0246* (2013.01); *G06K 9/6217* (2013.01); *G06T 11/00* (2013.01)

(58) Field of Classification Search
CPC ............................. G05D 1/0246; G06T 11/00
USPC .......................................................... 701/28
See application file for complete search history.

(56) References Cited

U.S. PATENT DOCUMENTS

| | | | | |
|---|---|---|---|---|
| 5,446,833 A | * | 8/1995 | Miller et al. .................. | 345/585 |
| 6,704,099 B2 | * | 3/2004 | Uomori .................. | G01B 11/25 345/173 |
| 6,894,717 B2 | * | 5/2005 | Bakewell ............. | G08G 1/0175 340/937 |
| 6,956,469 B2 | | 10/2005 | Hirvonen | |
| 6,956,960 B2 | * | 10/2005 | Kondo .................. | G06T 7/2013 348/155 |
| 6,970,102 B2 | * | 11/2005 | Ciolli ..................... | G08G 1/025 340/425.5 |
| 7,307,655 B1 | * | 12/2007 | Okamoto ........... | G06K 9/00791 348/222.1 |
| 7,889,913 B2 | * | 2/2011 | Wells .................... | G06T 7/0081 345/419 |
| 7,920,959 B1 | * | 4/2011 | Williams ...................... | 701/117 |
| 8,332,134 B2 | | 12/2012 | Zhang | |
| 2003/0219146 A1 | * | 11/2003 | Jepson ..................... | G06K 9/32 382/103 |
| 2004/0075738 A1 | * | 4/2004 | Burke et al. .................. | 348/143 |

(Continued)

FOREIGN PATENT DOCUMENTS

DE 102012000459 7/2012

OTHER PUBLICATIONS

Musleh, Identifying and Tracking Pedestrians Based on Sensor Fusion and Motion Stability Predictions, Sensors (Basel, Switzerland), 10(9), 8028-8053, Publication Date—Aug. 27, 2010, PMC3231198.

(Continued)

*Primary Examiner* — Tuan C. To
(74) *Attorney, Agent, or Firm* — McDonnell Boehnen Hulbert & Berghoff LLP

(57) ABSTRACT

An autonomous vehicle configured to detect and avoid pedestrians may use information from LIDAR or other range-based sensors. An example method involves: (a) receiving, at a computing device, range data corresponding to a plurality of objects in an environment of a vehicle, wherein the range data comprises a plurality of first data points; (b) generating a spherical data set comprising a plurality of second data points, wherein spherical coordinates for each second data point are generated based on a corresponding one of the first plurality of data points; and (c) determining a two-dimensional map based on the spherical data set comprising the plurality of second data points, wherein the two-dimensional map comprises a plurality of pixels, wherein each pixel of the plurality of pixels is indicative of a plurality of parameters corresponding to the plurality of objects in the environment.

14 Claims, 8 Drawing Sheets

(56) References Cited

U.S. PATENT DOCUMENTS

| | | | |
|---|---|---|---|
| 2004/0247173 A1* | 12/2004 | Nielsen et al. | 382/154 |
| 2007/0071311 A1* | 3/2007 | Rovira-Mas et al. | 382/154 |
| 2009/0226083 A1* | 9/2009 | Kim | G06T 7/408 382/164 |
| 2010/0104199 A1* | 4/2010 | Zhang et al. | 382/199 |
| 2010/0296724 A1* | 11/2010 | Chang | G06K 9/00208 382/154 |
| 2011/0255741 A1 | 10/2011 | Jung | |
| 2012/0020523 A1* | 1/2012 | Ikeda | G01B 11/005 382/103 |
| 2012/0035846 A1 | 2/2012 | Sakamoto | |
| 2012/0056887 A1* | 3/2012 | Kim et al. | 345/426 |
| 2014/0064560 A1* | 3/2014 | Gornick | G06K 9/00771 382/103 |
| 2014/0278065 A1* | 9/2014 | Ren | 701/454 |
| 2015/0160332 A1* | 6/2015 | Sebastian | G01S 17/023 356/5.04 |
| 2015/0172544 A1* | 6/2015 | Deng | G06T 9/001 348/36 |

OTHER PUBLICATIONS

Spinello, Tracking People in 3D Using a Bottom-Up Top-Down Detector, Social Robotics Lab, University of Freiburg, 2011, Germany.

Teichman, Tracking-Based Semi-Supervised Learning, Stanford University, Department of Computer Science, 2011.

* cited by examiner

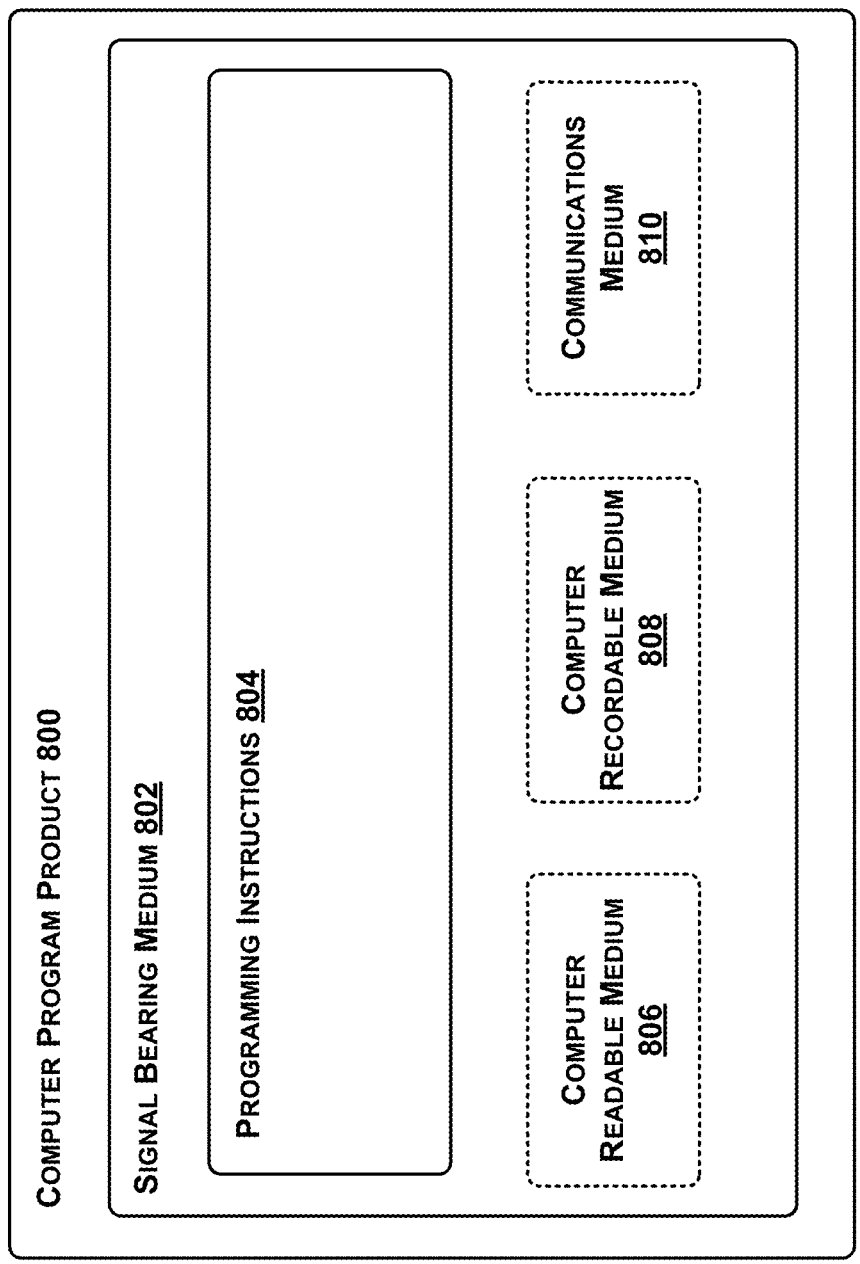

METHODS AND SYSTEMS FOR PEDESTRIAN AVOIDANCE USING LIDAR

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment and avoid collisions. For example, if the sensors sense that the vehicle is approaching an obstacle, the vehicle may navigate around the obstacle.

SUMMARY

Examples of systems and methods for pedestrian avoidance using LIDAR are described herein. In particular, a vehicle navigating a path of travel may receive information (e.g., range data) about the vehicle's environment from a LIDAR unit and/or other types of sensors. Upon receiving the information, a vehicle's computing system may configure the information into spherical coordinates or some other format and develop a two-dimensional mapping based on the information within the spherical coordinates. The two-dimensional (2D) map arranges the information received via sensors into different units similar to how an image contains pixels positioned throughout the image, with each providing colors and features that combine to generate the image. However, rather than providing color information (e.g., red, blue, green), the various units that are positioned throughout the 2D map may provide range, intensity, and elevation information corresponding to objects within the environment as originally acquired by the LIDAR unit and/or other type of vehicle sensor. The vehicle's computing system may detect, identify, and/or avoid pedestrians and/or other objects using basic 2D image analysis techniques, such as a sliding window scan, which may be less complex and/or more accurate than other techniques for detecting the presence of pedestrians and/or other objects that it is desirable to avoid. Analyzing LIDAR information in a 2D map format may enable a vehicle to locate pedestrians and alter its control strategy to avoid the pedestrians.

In one aspect, a computer-implemented method involves: (a) receiving, at a computing device, range data corresponding to a plurality of objects in an environment of a vehicle, wherein the range data comprises a plurality of first data points; (b) generating a spherical data set comprising a plurality of second data points, wherein spherical coordinates for each second data point are generated based on a corresponding one of the first plurality of data points; and (c) determining a two-dimensional map based on the spherical data set comprising the plurality of second data points, wherein the two-dimensional map comprises a plurality of pixels, wherein each pixel of the plurality of pixels is indicative of a plurality of parameters corresponding to the plurality of objects in the environment.

In another aspect, a vehicle system comprises one or more sensors and a computer system. The computer system is configured to: (a) receive range data corresponding to a plurality of objects in an environment of a vehicle, wherein the range data comprises a plurality of first data points; (b) generate a spherical data set comprising a plurality of second data points, wherein spherical coordinates for each second data point are generated based on a corresponding one of the first plurality of data points; and (c) determine a two-dimensional map based on the spherical data set comprising the plurality of second data points, wherein the two-dimensional map comprises a plurality of pixels, wherein each pixel of the plurality of pixels is indicative of a plurality of parameters corresponding to the plurality of objects in the environment.

In yet another aspect, a non-transitory computer-readable medium has program instructions stored thereon that are executable by at least one processor. The program instructions comprise: (a) instructions for receiving, at a computing device, range data corresponding to a plurality of objects in an environment of a vehicle, wherein the range data comprises a plurality of first data points; (b) instructions for generating a spherical data set comprising a plurality of second data points, wherein spherical coordinates for each second data point are generated based on a corresponding one of the first plurality of data points; and (c) instructions for determining a two-dimensional map based on the spherical data set comprising the plurality of second data points, wherein the two-dimensional map comprises a plurality of pixels, wherein each pixel of the plurality of pixels is indicative of a plurality of parameters corresponding to the plurality of objects in the environment.

In still another example, a system is provided that comprises a means for receiving range data corresponding to a plurality of objects in an environment of a vehicle, and the range data comprises a plurality of first data points. The system also comprises a means for generating a spherical data set comprising a plurality of second data points, where spherical coordinates for each second data point are generated based on a corresponding one of the first plurality of data points. The system further comprises a means for determining a two-dimensional map based on generating the spherical data set comprising the plurality of second data points, where the two-dimensional map comprises a plurality of pixels, and where each pixel of the plurality of pixels is indicative of a plurality of parameters corresponding to the plurality of objects in the environment.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 8 is a schematic illustrating a conceptual partial view of an example computer program product that includes a computer program for executing a computer process on a computing device.

DETAILED DESCRIPTION

Figure 1:
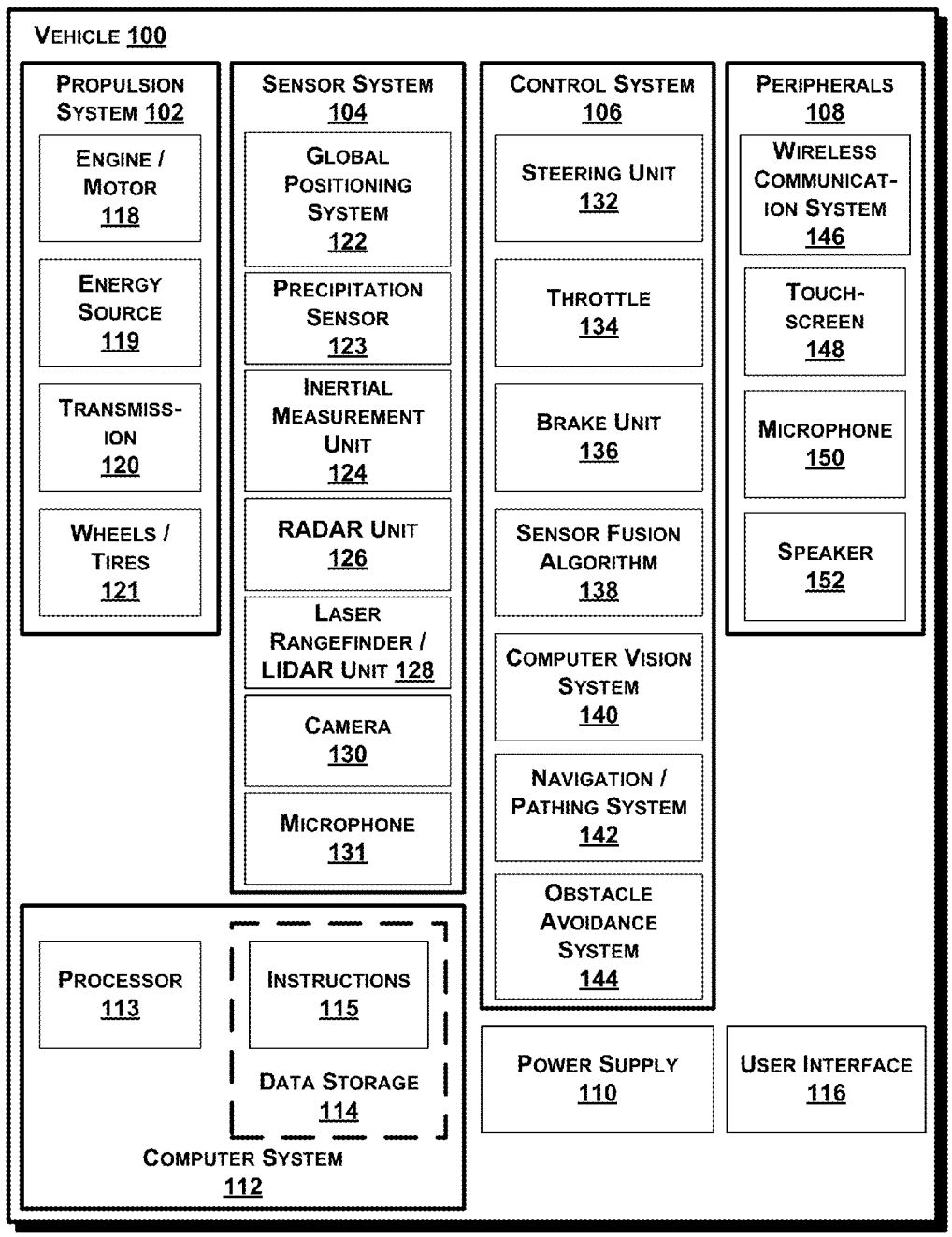
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Example embodiments may relate to an autonomous vehicle, such as a driverless automobile, that may detect and avoid pedestrians and/or other objects using information provided by a LIDAR unit and/or other vehicle sensors. Further, upon detecting a pedestrian and/or another type of object, the autonomous vehicle may alter its path of travel in order to avoid the pedestrian and/or the other type of object.

To facilitate object detection, LIDAR may provide information about the vehicle's environment by illuminating the environment with lasers and measuring the reflected light. A computing device or system associated may then determine the distances and relative locations of objects using the data provided by the LIDAR unit.

More specifically, to detect an object based on range data received from a LIDAR unit and/or other sensors, a vehicle's computing system may generate a 3D point cloud based on information captured by the sensors. A LIDAR unit and/or other sensor may capture information about objects in the form of data points, which may make up the 3D point cloud. The information associated with the various data points may also be referred to as range data, and may provide information related to the position and orientation of objects in the environment relative to the vehicle (e.g., a 3D mapping of the environment). The data points may also enable a computing system to determine materials and other information about objects in the environment.

A point cloud is a set of data points in some coordinate system. Data points within a point cloud may be organized within a 3D coordinate system, which may be defined by an X, Y, and Z coordinates, for example. In addition to providing information relating to distances between objects and the LIDAR unit, the data points may also represent the external surface of an object or multiple objects. Within a point cloud, a computing system may cluster similar points together and fill in the appropriate patterns according to the data points to detect objects within the environment. The computing system may use various techniques to convert a point cloud to a 3D surface. Some approaches, like Delaunay triangulation, alpha shapes, and ball pivoting, build a network of triangles over the existing vertices of the point cloud, while other approaches convert the point cloud into a volumetric distance field and reconstruct the implicit surface so defined through a marching cubes algorithm.

Furthermore, a computing device or system may analyze the data points within the 3D point cloud (as data points or as determined 3D surfaces) to determine the sizes, positions, and/or orientations of objects in the environment. Likewise, the computing device recognize objects within a point cloud by clustering data points that correspond to the same object and may also determine the materials of the object based on the reflections of the data points on the various objects.

However, using clustering techniques to identify specific objects within information formatted into a 3D point cloud may require substantial amounts of time and/or processing power. Further, an object of interest may not be identifiable using clustering techniques due to the layout and/or positioning of the object within the environment. For example, a computing system may not be able to detect a pedestrian standing in front of a tree or vehicle within a 3D point cloud because point clustering may cluster and identify the pedestrian and the other object as a single object, which thus has an unknown shape. The computing system may need to perform multiple iterations of analysis to separate and identify the pedestrian from the other object during the 3D point cloud analysis. Thus, while formatting LIDAR data in a 3D point cloud may allow a computing device to identify objects in some instances, the computing device may need to devote more resources (e.g., time/power) to accurately scan and identify objects within the cloud. The example implementations discussed may help to overcome some of the deficiencies that can arise during the execution of traditional clustering techniques.

For instance, in an example embodiment, a vehicle's computing system may generate a spherical data set based on the range data gathered from the LIDAR unit or other vehicle sensors. Generating the spherical data set may involve the computing device projecting the LIDAR returns into spherical coordinates or some other useful format. A spherical coordinate system may be represented as a coordinate system for three-dimensional space, where the position of a point is specified by three numbers: the radial distance of the point from a fixed origin, its polar angle measured from a fixed zenith direction, and the azimuth angle of its orthogonal projection on a reference plane that passes through the origin and is orthogonal to the zenith, measured from a fixed reference direction on that plane. Other coordinate-based systems may be used as well.

In some implementations, the computing device may cluster the range data points received in the LIDAR measurements prior to projecting the range data into spherical coordinates or some other format. Likewise, the computing device may project the range data points within spherical coordinates as the points are received within the laser returns from the LIDAR unit. Other examples of gathering the range data may exist as well.

In another aspect, based on configuring the information received from the LIDAR unit into a new format or projecting the information based on a different coordinate system (e.g., spherical coordinates), the computing device may use the spherical coordinates to configure the information into a 2D map for computer-analysis and object detection/identification. The 2D map-format establishes a physical layout that encompasses the information corresponding to the 3D mapping of objects within the environment. The 2D map-format may include multiple 2D images that include data points corresponding to the environment. A computing system may analyze the LIDAR information within the 2D map-format to determine the positioning of objects within the environment relative to the vehicle. Within implementations, the generated 2D map may be created using any number of units (e.g., pixels) positioned throughout the 2D map similar to pixels within a photographic image. Each unit may be positioned at various points throughout the 2D map. For example, each unit may be placed at different coordinates, such as (1,1) or (2,2) within the 2D map format as if the 2D map was based on a horizontal axis and vertical axis. Within examples, the computing device may format the LIDAR information into a 2D map-format that may include any number of units.

In such implementations, each unit positioned within the 2D map-format may provide information to the computing device that may include various parameters associated with particular objects in the environment. For example, each unit within the 2D map may record the range of that point from the sensor connected on the vehicle. A computing device or system analyzing the 2D map may determine the distance between objects in the environment and the vehicle based on the units corresponding to the objects. Each unit positioned within the 2D map may provide the computing device with range information as positioned within the vehicle's actual environment. The 2D map may serve as a formatting means that enables a computing system to quickly and efficiently analyze the LIDAR information received. The 2D map may include multiple images that may each correspond to the environment.

In addition, the computing device may determine intensity information from analyzing the range data within the 2D map-format. The various units that make up the 2D map-format may provide a computing device with intensity information corresponding to objects within the environment. The intensity information may be gathered from LIDAR returns since different materials may alter the reflections of the lasers and cause the sensor to receive different information corresponding to the materials of the objects. For example, a computing device may be configured to differentiate between LIDAR information indicative of metals or clothing compared to a pedestrian's skin based on the intensity information. A computing device may use the intensity information to make adjustments to its path of travel, including using the intensity information to identify pedestrians.

Furthermore, the computing system may configure the 2D map in a way that each unit (e.g., pixel) within the 2D map provides elevation information corresponding to the objects within the environment. The computing device may use the range data received from a LIDAR unit or similar sensor and factor in information provided by an elevation map to configure the units within the 2D map to contain elevation information corresponding to the various objects. The computing device may analyze a unit or sets of units within the 2D map to determine an object's distance away from the vehicle and the height of the object. The computing device may use the elevation information to differentiate between objects and ground clutter. For example, a computing device may determine that data points received within LIDAR scans may correspond to actual objects rather than ground clutter.

In one such implementation, a computing system may configure a 2D map to include multiple images that correspond to the same area in the environment. The multiple images may be based on different information, however. For example, a top image within the 2D map may correspond to elevation information of objects in the vehicle's environment. Likewise, the images may correspond to range information and/or intensity information indicative of the vehicle's environment. The images may mirror each other, but may include different amounts of data points and/or may provide a computing system with a variety of information. A computing system may analyze the 2D map format information to detect pedestrians in order to avoid the pedestrians in the environment.

In one aspect, a computing device associated with a vehicle may receive the LIDAR scans and utilize an elevation map to determine range data points that correspond to ground clutter, which may not require any actions from the vehicle. By determining the range data points corresponding to ground clutter or other unwanted objects, the computing device may project the range data points into spherical coordinates without including the identified data points that correspond to ground clutter. Thereafter, when the computing device develops the 2D map-format based on the range data points within the spherical coordinates, the computing device may properly eliminate unnecessary data points from existing within the 2D map. By eliminating the unnecessary points, the computing device may improve the efficiency for detecting obstacles within the environment that may actually require the vehicle to adjust its path rather than ground clutter that may likely not represent any obstacles to the vehicle. The computing device may save time and/or power since the refined range data may not require the device to analyze as many data points as the originally received set. Further, the computing device may analyze data points based on the parameters possibly equating to specific objects and/or pedestrians without analyzing data points indicative of unwanted, ground data points.

With regards to analyzing the range data positioned in a 2D map-format, computing devices and/or systems of a vehicle may use various techniques and/or software. A computing device or system may use processes and/or algorithms relating to computer vision techniques. The computing device may also utilize machine vision or scene reconstruction processes, for example. During execution, an autonomous vehicle may utilize previous LIDAR scans to improve the efficiency of the object detection. The computing device may utilize other image-based analysis as well.

In one example implementation, to evaluate a given vehicle's environment, an autonomous vehicle may analyze LIDAR-based information to detect and avoid pedestrians within a 2D format using a sliding window scan. To execute a sliding window scan, a computing device or another entity assisting with the vehicle's operations may scan LIDAR information units as formatted within the 2D map using a fixed-size rectangular window. In some instances, the computing device may utilize a different shaped window and/or may adjust the size of the window depending on the 2D map information. Applying a sliding window scan may allow the computing device to focus and analyze subsets of the entire 2D map. The computing device may focus upon certain units and determine if the information provided by the units correspond to an object or pedestrian. The sliding window scan may also improve the computing device's accuracy for differentiating objects captured within the LIDAR scans. For example, the sliding window may allow the vehicle's computing device to focus upon units and determine that a pedestrian is standing in front of a vehicle or another object. The sliding window scan may also be useful to analyze the 2D map to identify pedestrians standing within a group of pedestrians. The computing device may analyze the LIDAR information within the 2D map-format using the sliding window and/or other analysis processes to detect and avoid specific objects and/or pedestrians.

Some example methods may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

Referring to the Figures, FIG. 1 is a functional block diagram illustrating a vehicle 100, according to an example embodiment. The vehicle 100 could be configured to operate fully or partially in an autonomous mode, and thus may be referred to as an "autonomous vehicle." For example, a computer system could control the vehicle 100 while in the autonomous mode, and may be operable to receive information from one or more sensors, upon which one or more control processes for an autonomous vehicle are based, to determine an information-improvement expectation that corresponds to an active-sensing action, to determine a risk cost that corresponds to the active-sensing action, and, based on both (i) the information-improvement expectation for the active-sensing action and (ii) the risk cost for the active-sensing action, to determine whether the active-sensing action is advisable.

It should be understood that an autonomous vehicle may be fully autonomous or partially autonomous. In a partially autonomous vehicle some functions may be manually controlled (e.g., by a person) some or all of the time. Further, a partially autonomous vehicle could be configured to switch between a fully-manual operation mode and a partially- or fully-autonomous operation mode.

The vehicle 100 could include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, and/or other materials or combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, at least one camera 130, and/or at least one microphone 131. The sensor system 104 could also include sensors configured to monitor internal systems of the vehicle 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the vehicle 100. To this end, GPS 122 could include a transceiver operable to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be a still camera or a video camera. In some embodiments, the camera 130 may be mechanically movable such as by rotating and/or tilting a platform to which the camera is mounted. As such, a control process of vehicle 100 may be implemented to control the movement of camera 130.

The sensor system 104 may also include a microphone 131. The microphone 131 may be configured to capture sound in the environment of vehicle 100. Further, in some implementations, a vehicle 100 may include multiple be configured to capture sound from the environment of vehicle 100. In some cases, multiple microphones may be arranged as a microphone array, or possibly as multiple microphone arrays.

The control system 106 may be configured to control operation of the vehicle 100 and its components. Accordingly, the control system 106 could include various elements include steering unit 132, throttle 134, brake unit 136, a sensor fusion algorithm 138, a computer vision system 140, a navigation/pathing system 142, and an obstacle avoidance system 144.

The steering unit 132 could represent any combination of mechanisms that may be operable to adjust the heading of vehicle 100.

The throttle 134 could be configured to control, for instance, the operating speed of the engine/motor 118 and, in turn, control the speed of the vehicle 100.

The brake unit 136 could include any combination of mechanisms configured to decelerate the vehicle 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of vehicle 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to allow interaction between the vehicle 100 and external sensors, other vehicles, other computer systems, and/or a user. For example, peripherals 108 could include a wireless communication system 146, a touchscreen 148, a microphone 150, and/or a speaker 152.

In an example embodiment, the peripherals 108 could provide, for instance, means for a user of the vehicle 100 to interact with the user interface 116. To this end, the touchscreen 148 could provide information to a user of vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to the user of the vehicle 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the vehicle 100 and its subsystems.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The environment could include other vehicles, traffic lights, traffic signs, road markers, pedestrians, etc. The computer vision system 140 could recognize the various aspects of the environment based on object recognition models stored in data storage 114, or by using other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
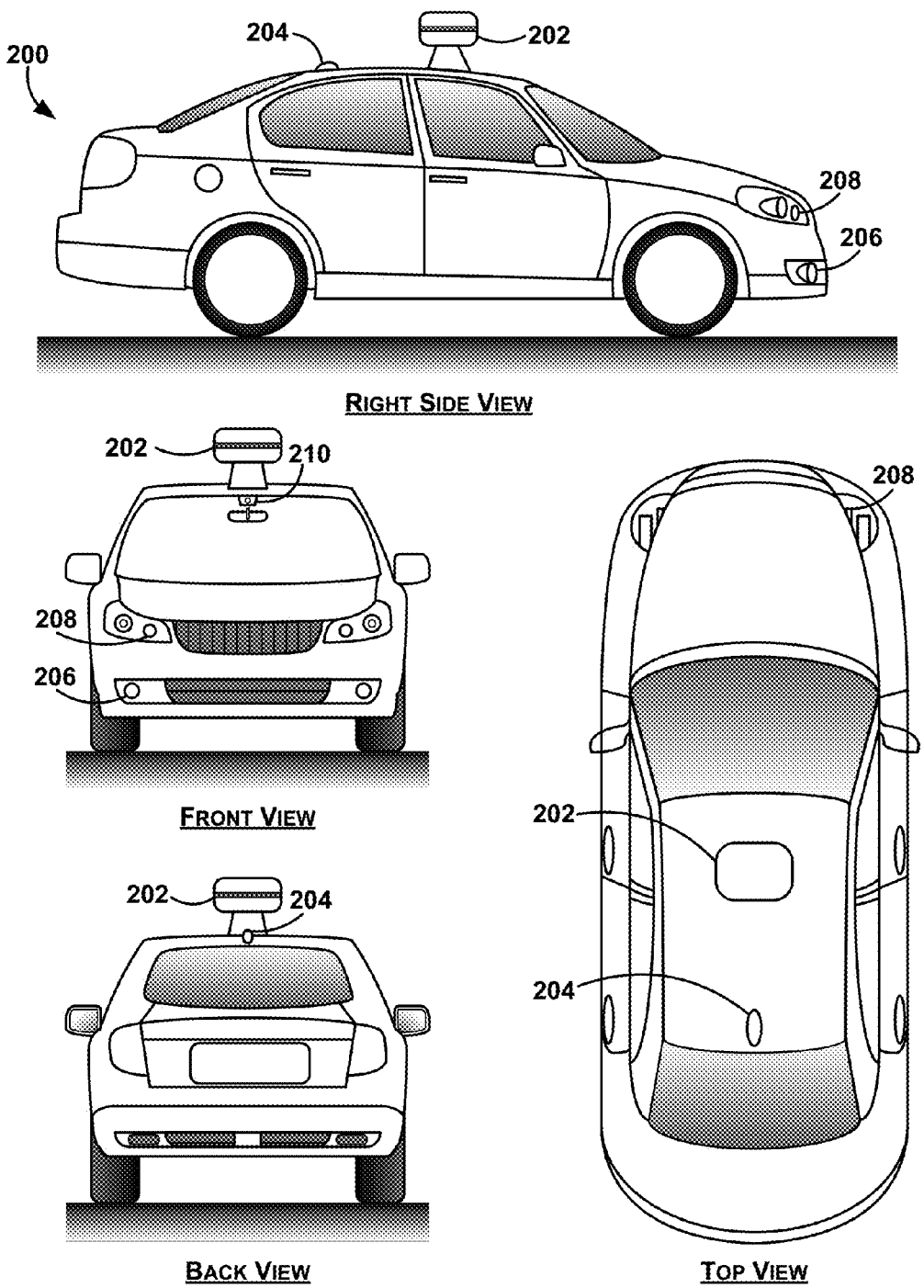
FIG. 2 shows a vehicle, according to an example embodiment.

FIG. 2 shows a vehicle 200 that could be similar or identical to vehicle 100 described in reference to FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

Depending on the embodiment, vehicle 200 could include a sensor unit 202, a wireless communication system 204, a LIDAR unit 206, a laser rangefinder unit 208, and a camera 210. The elements of vehicle 200 could include some or all of the elements described for FIG. 1.

The sensor unit 202 could include one or more different sensors configured to capture information about an environment of the vehicle 200. For example, sensor unit 202 could include any combination of cameras, RADARs, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques.

For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine the distance to the points on the object. The predetermined light pattern may comprise infrared light, or light of another wavelength.

As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object.

As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated, the camera 210 could capture images from a forward-looking view with respect to the vehicle 200. Other mounting locations and viewing angles of camera 210 are possible, either inside or outside the vehicle 200.

The camera 210 could have associated optics that could be operable to provide an adjustable field of view. Further, the camera 210 could be mounted to vehicle 200 with a movable mount that could be operable to vary a pointing angle of the camera 210.

Figure 3:
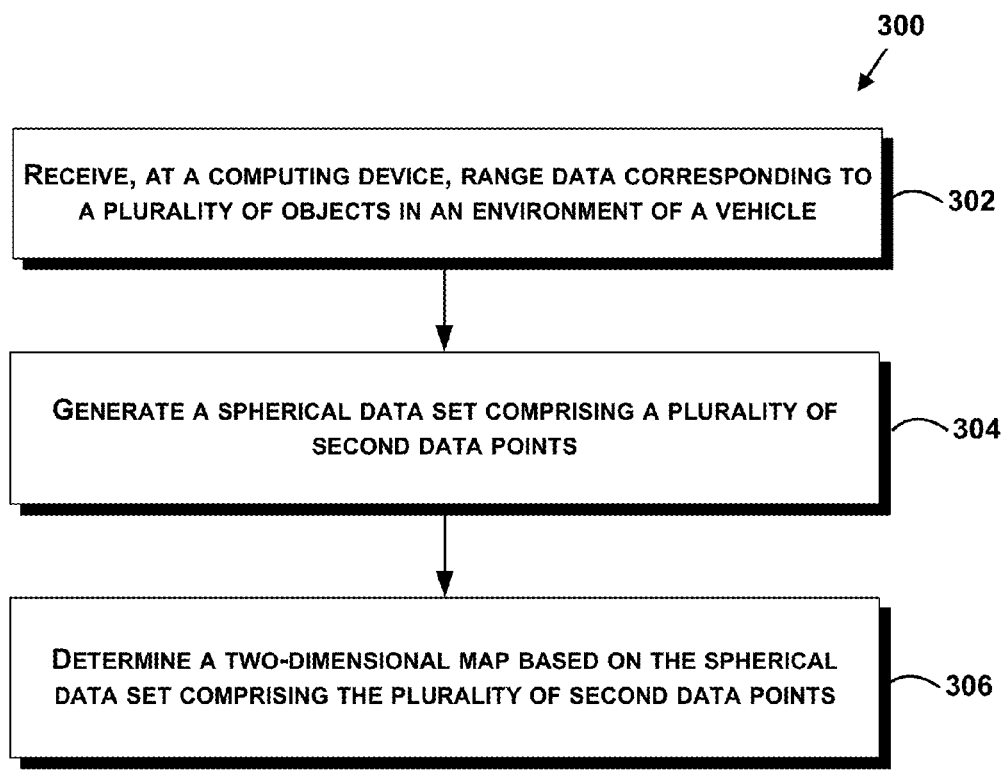
FIG. 3 is a simplified flow chart illustrating a method, according to an example embodiment.

FIG. 3 is a flow chart of an example method 300 for avoiding pedestrians using LIDAR and/or similar range-based sensor units. The method 300 may include one or more operations, functions, or actions as illustrated by one or more blocks 302-306. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device that may execute some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

As shown by block 302, the method 300 includes receiving, at a computing device, range data corresponding to a plurality of objects in an environment of a vehicle. A vehicle, such as an autonomous vehicle, may include various sensors, systems, and/or other components that may be configured to capture information corresponding to the environment of the vehicle. Possible sensors that may be configured with a vehicle may include LIDAR, RADAR, GPS, cameras and/or other types of sensors. The various vehicle sensors and systems may capture information about objects within the vehicle's environment, including range data that may map portions of the vehicle's environment.

In addition to vehicle sensors, a vehicle may also include various computing devices, systems, and/or other types of controllers. The various computing devices and systems may be configured to assist with various operations of the vehicle, which may include the detection and identification of objects within received range data. In one such example, a computing device or system may be configured to receive range data corresponding to a plurality of objects from the LIDAR system or other sensors and perform analysis upon the range data to identify the objects.

Within examples, the range data captured by a LIDAR unit and/or similar sensor may include a plurality of data points that may correspond to various parameters associated with the objects within the vehicle's environment. Each data point may provide a computing device with information relating to the measurements determined by the laser returns as sent and received by the LIDAR unit or similar range-based sensor module. Environments that include more objects may cause a LIDAR unit to receive range data that includes more data points, since each data point may provide information that corresponds to one of the many objects within the environment.

Furthermore, analyzing the range data may provide a computing device or other systems of the vehicle with an array of information corresponding to objects within the vehicle's surrounding environment. For example, the range data may provide range information, such as distances corresponding to the objects within the environment relative to the vehicle. The computing device may determine the distance between the vehicle and other objects based on the range information. Similarly, the computing device may also determine the relative distances between objects within the environment or other parameters relating to distances. Overall, a computing device may analyze the range data to determine a 3D mapping of the environment, which may include various distances and measurements between the vehicle, objects, and other elements within the environment.

In addition, the vehicle's computing system receiving the range data from the LIDAR and/or other sensor-based unit may utilize different processes and/or software to analyze the range data to possibly determine intensity information about the objects within the environment. A LIDAR unit, for example, may use ultraviolet, visible, or near infrared light to image objects and capture data points (e.g., range data). Furthermore, LIDAR may be used to detect a wide range of target objects, including various objects, pedestrians, rocks, rain, chemical compounds, aerosols, clouds, and/or single molecules. The LIDAR unit may utilize a narrow laser beam, which can be used to map physical features with high resolution. A vehicle's computing system may use LIDAR information to achieve 3D imaging of the vehicle's environment. During operation, LIDAR determine measurements, such as distances between objects and the vehicle and intensity of the returns, based on the returns received by the LIDAR unit's sensors. Different materials may be detected within the returns received by the LIDAR unit. A computing device may analyze the range data received by a LIDAR unit and determine that different objects are configured with different materials based on the reflections received.

At block 304, the method 300 further includes generating a spherical data set comprising a plurality of second data points. In one such example implementation, a computing device or system assisting in the operations of a vehicle may generate the spherical data set based on the range data received initially from the sensor-based returns. The spherical data set may include a second data point that may be generated based on a corresponding one of the data points within the range data.

Within examples, a vehicle's computing system may project received range data into spherical coordinates or other formats. The computing system may configure the data within the point cloud into spherical coordinates or some other format. The vehicle's computing device may manipulate the range data initially received using various techniques prior to configuring the points into spherical coordinates.

A spherical coordinate system can be a coordinate system for 3D space, where the position of a point is specified by three numbers: the radial distance of that point from a fixed origin, its polar angle measured from a fixed zenith direction, and the azimuth angle of its orthogonal projection on a reference plane that passes through the origin and is orthoganl to the zenith, measured from a fixed reference direction on that plane. The radial distance may also be called the radius or radial coordinate. The polar angle may be called colatitude, zenith angle, normal angle, or inclination angle. Within other implementations, the use of symbols and/or the order of coordinates differ between sources. For example, within a geographical coordinate system, positions are measured in latitude, longitude, and/or height or altitude. Other formats or coordinate systems may be used within examples.

Projecting the received LIDAR information into spherical coordinates may enable a computing system to reformat the information further. In some instances, the computing system may refine the information within the spherical coordinates to eliminate unnecessary or unwanted data points. Likewise, the computing system may be able to configure the LIDAR information into a 2D format, 3D format, or some other format that enables accurate analysis. The spatial references may vary based on the format of the information. A computing system may use a map projection process to relate spherical coordinates to flat, planar coordinates. Different projections may cause different types of distortions.

A computing system may utilize spherical coordinates to minimize the distortion of one or two of the LIDAR data's characteristics. Furthermore, a computing system may use a projection (e.g., into spherical coordinates) to maintain the area of a feature or the environment, but alter its shape. Configuring the LIDAR information into spherical coordinates may utilize various processes, algorithms, and/or software. The projection may enable further analysis and/or formatting of the LIDAR information.

In a further aspect, a computing device or system assisting with the operations of a vehicle may receive the range data from the LIDAR unit or other vehicle sensors. Upon receiving the range data, the computing device may utilize an elevation map that corresponds to the vehicle's location. Based on the information provided within the elevation map, the computing device may further configure the range data received from the LIDAR unit and/or other sensors to reflect the information provided within the elevation map. For example, the computing device may determine which range data points correspond to particular objects and use the elevation map to configure those range data points to also reflect the elevation of the particular objects as according to the elevation map. By using the elevation map, the computing device may add additional information to the range data. Other information may be added to the range data as well.

In some example implementations, a vehicle's computing system may further configure the range data when projecting the information into spherical coordinates or similar format. For example, the computing system may filter the range data based on various factors and configure the filtered range data into spherical coordinates or other format. In one such example, the computing system may remove any points from the range data that correspond to unwanted objects, such as ground clutter, as provided by the elevation map. Ground clutter may represent any data points that do not require the vehicle to make any adjustments to its path of travel (i.e., the vehicle may travel over the ground clutter without any problems/collisions). The computing system may use the range data without points corresponding to ground clutter. The computing system may data points within the range data to meet or exceed a predefined elevation/height. In the case that the computing system reads data points that do not meet the predefined elevation, the computing system may delete and/or remove the data points from the range data that is projected into a new format (e.g., spherical coordinates).

Further, the computing system may filter the range data based on other factors, such as grouping similar points together and eliminating any points determined to be erroneous. For example, the computing system may filter the range data based on distances or intensity information provided by the individual data points within the range data. The computing system may filter range data prior to formatting the points within spherical coordinates. Likewise, the computing device may filter the range data after and/or simultaneously to formatting the points within spherical coordinates or another format.

At block 306, the method 300 includes determining a two-dimensional map based on the spherical data set comprising the plurality of second data points. In an example illustration, a vehicle's computing system may determine a 2D map or similar 2D format based on the spherical data set formatted from the range data received from the vehicle's LIDAR unit or similar range-based sensing entity. The computing system may use various processes and/or mathematical formulas to relate spherical coordinates to flat, planar coordinates in the 2D map format, for example. The computing system may use a projected coordinate system to assist with formatting the 2D map information. Likewise, the projected coordinate system may include constant lengths, angles, and areas across the two-dimensions for configuring the LIDAR information. Other systems may be used by the computing system as well to configure the LIDAR information from the spherical coordinates into a 2D format.

Further, the 2D map may include multiple images that correspond to the same and/or different portions of the environment. For example, the 2D map may include three images corresponding to the same portion of the environment. The three images may include data points that provide different information to the computing system. For example, one of the images may provide elevation information to the computing system. Likewise, the images include data points that provide range and/or intensity information to the vehicle's computing system. The computing system may analyze the multiple images at the same time to identify data points indicative of objects and/or pedestrians.

The computing system may configure the LIDAR information from the spherical coordinates into a 2D map format in a way that the width of the 2D map represents azimuth angles of the spherical coordinates and the height of the 2D map represents elevation angles of the spherical coordinates. In other examples, the 2D map's height may represent other information or the azimuth angles, for example. Similarly, the 2D map's width may Other configurations may exist as well.

The 2D map may be configured in a format that resembles the positional format of an image, but may further provide computer systems or other entities of the vehicle with information corresponding to objects within the vehicle's environment. Similar to an image, the 2D map may include any number of pixels or other units that are positioned within the 2D map to reflect the 3D layout of objects within the environment. Within examples, rather than the pixels representing different RGB colors as typical within a 2D image as captured by a camera, the 2D map may include pixels that provide information, which may include intensity, range, and/or elevation information corresponding to the vehicle's environment, including information about the objects within the environment. The 2D map may not exist as an image, but merely as information positioned within a 2D format (e.g., X and Y coordinates) that allows a computing device to analyze the information quickly. For example, the 2D map may exist based on two axes (e.g., horizontal and vertical axes) and may include the different units positioned throughout the 2D format. The computing device may analyze any portion of the 2D format, including subsets of the LIDAR information. The different units that make up the 2D map may be positioned in a uniform manner, such as in rows and columns. In some instances, the different units may be positioned randomly within the 2D map boundary.

For an example implementation, a vehicle's computing system may analyze the various units (e.g., pixels) within the 2D map to determine how far away from the vehicle that an object may be and the intensity of the returns relating to that object, which may provide the computing device with information relating to the materials that make up that object. Different materials may cause a LIDAR unit to receive laser returns at different rates or ways, which may allow a computing device to determine materials based on the reception. In addition, the computing device may also analyze the pixels to determine the elevation of objects within the environment. Pixels serve as an example representation and may be replaced by other units within the 2D map format. Furthermore, multiple pixels may exist together to represent a particular object within the vehicle's environment. A computing device may be configured to group pixels together to identify objects during analysis.

A computing device may further refine the data within the 2D map format to increase efficiency. The computing device may eliminate units within the 2D map if the units are determined to be unnecessary or unwanted. For example, the computing device may remove any data points within the 2D map if the data point corresponds to ground clutter. In some examples, the computing device may highlight certain data points that may be more important than other points.

In some implementations, a computing device or system assisting with the operations of a vehicle may generate and analyze range data within a 2D map format to increase efficiency and lower the amount of time required to identify objects. The computing device may perform the processes relating to identify objects with less power, for example. Furthermore, the computing device or system may utilize the 2D mapping process to increase accuracy related to identifying objects within the vehicle's environment. For example, the computing device may analyze range data within a 2D map format to identify pedestrians. The computing device may use various techniques to analyze the 2D map format, including focusing upon the individual pixels that may disclose various parameters corresponding to objects in the environment.

The computing device may analyze the 2D map to identify pedestrians within the vehicle's environment. The computing device may use filters, such as searching for data points within a specific range of elevation. Other filters may be based on range information or intensity information, for example. The computing device may seek for data points that provide intensity information similar to the returns received that indicate an pedestrian's skin. The computing device may use a combination of filters or analysis techniques to identify pedestrians. For example, a computing device may scan the 2D format to find pixels that correspond to a specific range of elevation (e.g., typical pedestrian height) and intensity information that correspond to clothing and/or skin.

In a further aspect, an autonomous vehicle may utilize a sliding window scan to analyze the 2D map, including reading the information provided by the various pixels. A sliding window scan may be used to identify and localize objects within an image or a 2D map format as described. A computing device or another entity performing the sliding window scan may scan the 2D map or image with a fixed-size rectangular window. The computing device may further utilize a classifier to analyze the subset of the 2D map as defined by the fixed-size sliding window. The classifier may extract map or image features from within the window and returns the probability that the window bounds an object. The computing device may repeat the process using the same sized sliding window or may alter the sliding window's size as determined necessary. The computing device may further apply non-maximal neighborhood suppression or other analysis means to the output to remove possible multiple detections of the same object.

During implementing such a process, the computing device may focus upon subsets of the 2D map or image for analysis. The 2D map may include multiple images corresponding to the same portion of the environment for analysis purposes, for example. The computing device may use the sliding window scan or other techniques to identify pedestrians or other objects within the 2D map-format. The sliding window scanning process may be used by a computing device controlling functions of vehicle to analyze pixels within the determined 2D map-format.

A vehicle's computing system may be configured to search the LIDAR information within the 2D format based on certain parameters or a predefined analysis. The computing system may scan searching for data points that meet specified elevation, intensity, and/or range requirements, for example.

In yet another aspect, a computing device or system assisting with the operations of a vehicle may use additional information to identify pedestrians or other objects for avoiding within the configured 2D map format of the range data corresponding to the vehicle's environment. The computing device may utilize previously gathered information to confirm possible pixels as accurately corresponding to a particular object (e.g., pedestrian).

Autonomous vehicle may use the information provided by LIDAR and/or other sensors for obstacle detection and avoidance to navigate safely through environments. A vehicle's computing device may adjust the vehicle's navigation system based on the information provided within the LIDAR returns. Through configuring range data received from vehicle sensors into a readable 2D map-format, a vehicle system may analyze the 2D map or subsets of the map to identify objects.

The computing device may cause a vehicle to stop, slow down, speed up, alter direction, or other changes based on identifying pedestrians and/or other objects within the information captured by the LIDAR unit and formatted into a 2D map for analysis. Other adjustments may be made based on the information provided within the 2D format as well.

Figure 4:
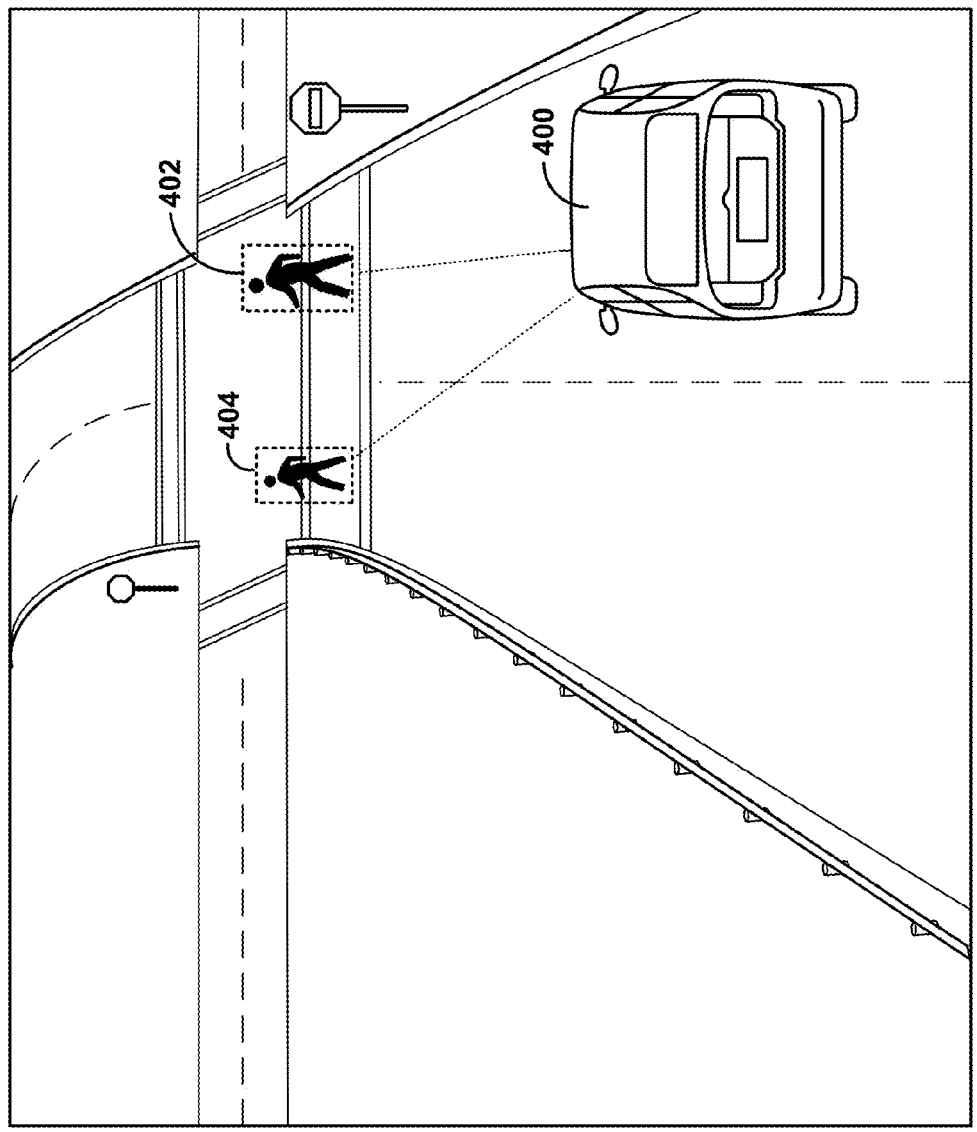
FIG. 4 illustrates an autonomous vehicle operating scenario, according to an example embodiment.

FIG. 4 illustrates an autonomous vehicle operating scenario, according to an example embodiment. Within the example shown in FIG. 4, the autonomous vehicle 400 may use LIDAR or a similar range-based sensing unit to detect and avoid the pedestrians 402-404 crossing the road at the intersection. Systems and controllers/computing devices of the vehicle 400 may execute functions that may allow the vehicle to detect, identify, and avoid the pedestrians.

In one such example, the vehicle 400 may perform the method 300 as described above or a variation of the method. The vehicle 400 may include a LIDAR unit and/or other sensors that may capture range data corresponding to the objects within the vehicle's environment. The vehicle may travel along the road while capturing information about the environment to determine future navigation commands. As the vehicle travels, the LIDAR unit may provide laser returns to a computing device or system associated with the vehicle which includes intensity information and range information corresponding to objects. In addition, the computing device may use the information provided by the LIDAR unit along with an elevation map to determine elevation information corresponding to the various objects within the vehicle's environment.

The vehicle 400 may analyze the range data provided within LIDAR returns as presented within the received 3D point cloud. A computing device or system assisting with the operations of the autonomous vehicle 400 may cluster points prior to performing classification. However, the computing device may determine inaccurate results in some situations if the pedestrians are difficult for the classifier to detect within the 3D point cloud. To counter the possible negative results that may occur using clustering, the computing device or system may generate the 3D point data received from a LIDAR sensor into spherical coordinates. Based on the range data projected within spherical coordinates, the computing device may store the information within a 2D map-format, which may include multiple images corresponding to the same area of the environment. As previously discussed, the 2D map may layout the 3D point data in a 2D readable format that enables the computing device to select portions of the 2D map to analyze and identify objects within as positioned within the vehicle's environment.

In some implementations, the 2D map may include pixels or other units positioned throughout the 2D map. Each pixel or unit may include information as determined within the LIDAR measurements. For example, the computing device may generate the 2D map to include pixels that provide intensity and range information about objects within the vehicle's environment. Further, the computing device may use the LIDAR information along with an elevation map or other means to determine elevation information about objects in the environment. The computing device may configure elevation information by knowing the height of the ground at all locations of interest (e.g., elevation map) along with determining which points from the 3D point data received are above the ground surface. The computing device may determine which points form the 3D point data received within the LIDAR returns and configure an obstacle grid, for example. By determine such an obstacle grid or into a similar format, the computing device may avoid projecting points that are at the ground level into the spherical coordinates. Through projecting points based on a certain elevation, the computing device may configure a 2D map of the 3D range points without including any points that display no elevation. The 2D map may show information for objects with elevation and may avoid extra points that correspond to ground materials.

In some example implementations, the computing device or system assisting with the operations of the vehicle 400 may analyze the 2D image through various means. For example, the computing device or similar controller-type entity of the vehicle may analyze the 2D map using a sliding window scan. The sliding window scan may allow the vehicle 400 to focus upon subsections of the 2D map to identify possible objects, including pedestrians. Upon identifying pedestrians, the computing system may provide instructions or commands to systems of the vehicle to adapt the control path to the environment. For example, as shown within the FIG. 4, the computing device may detect, identify, and enabling avoiding the pedestrians 402-404 and control systems of the vehicle to stop prior to the intersection to ensure that the vehicle does not collide with the pedestrians. Furthermore, the computing device may cause systems to act with additional caution to avoid a possible collision that may result from any spontaneous actions from the pedestrians. The vehicle 400 may proceed with caution until the pedestrians 402-404 are completely across the road and not in a possible path of navigation.

Figure 5:
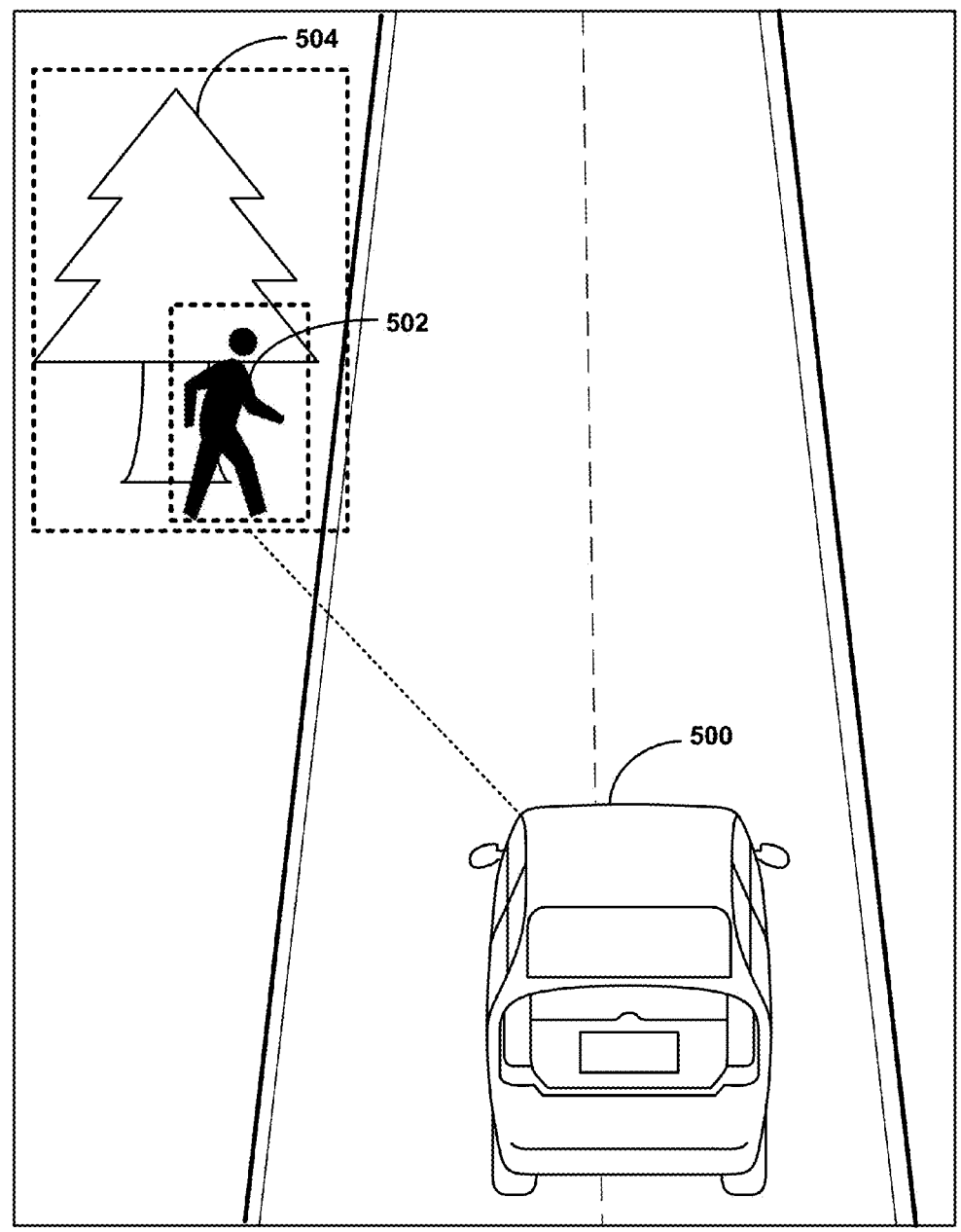
FIG. 5 illustrates another autonomous vehicle operating scenario, according to an example embodiment.

FIG. 5 illustrates an additional autonomous vehicle operating scenario, according to another example embodiment. As shown in FIG. 5, the example includes a vehicle 500 navigating down a road. Along the road, the example also shows a pedestrian 502 standing in front of a tree 504. As the example depicts, the pedestrian is positioned next to the road in a way that the pedestrian may enter the road at any given moment. Therefore, it may be necessary for the vehicle 500 to not only detect, identify, and avoid the pedestrian, but also possibly factor in changes to the systems in control of the vehicle's navigation.

The vehicle 500 may be configured to operate within an autonomous or semi-autonomous mode, for example. In some instances, the vehicle 500 may receive input from a driver and varying degrees of assistance from computing devices, controllers, or other systems that exist within the vehicle 500. The vehicle 500 may be any type of vehicle, including the vehicles discussed within FIGS. 1-2. Furthermore, the vehicle 500 may include a variety of systems and sensors that provide the vehicle's computing systems with information about the surrounding environment of the vehicle, including information regarding the detection and location of objects. The vehicle 500 may use LIDAR and/or other range-based sensors to gather information about nearby objects through the use of lasers or other means (e.g., radio waves) that measure distances and may also provide information regarding the materials or other parameters about objects. In one implementation, a computing device or system may cluster the LIDAR returns into a 3D point cloud that may provide upon analyze a 3D mapping of the objects within the environment. However, by clustering the points, the computing device may require additional time to analyze the 3D point cloud to identify objects within the range data.

In some implementations, the computing device or system may project the range data received within the LIDAR returns into spherical coordinates. The computing system may further use an elevation map that matches up with the location of the range data received within the LIDAR scans to determine any points within the 3D points that correspond to objects without any elevation. The computing device may remove, in some instances, any points that do not display a particular amount of elevation, which may be defined or predetermined. By removing any points that do not include elevation, the computing device may focus upon and utilize the points that correspond to actual physical objects rather than points that correspond to the road or ground. The computing device assisting with operations of the vehicle 500 may project the wanted range data (e.g., points showing elevation) into spherical coordinates. Using this projection, the computing device may further determine a 2D map based on the information provided by the LIDAR unit and as refined using the elevation map. The 2D map may display the same information as the conventional 3D point cloud, but may also eliminate unnecessary points that would have required unnecessary analysis from the computing device.

A computing device or another entity associated with the vehicle 500 may analyze the LIDAR information as formatted and simplified within the 2D map-format. Each unit making up the 2D map-format may provide the computing device with a variety of information corresponding to the vehicle's environment, which may include elevation, range, and/or intensity information about nearby objects. The computing device may use traditional means to analyze the 2D map, such as image analysis techniques and/or computer vision.

In one aspect, a computing device or system of the vehicle 500 may analyze the LIDAR information formatted within the 2D map-format using a sliding window scan. The sliding window scan may allow the computing device to focus upon subsets of the 2D map in order to detect and identify objects.

As shown within the example illustrated in FIG. 5, the vehicle 500 may navigate a path and capture information using LIDAR and/or other sensors. A computing device may receive the information and project the range data into spherical coordinates that may involve the computing device using an elevation map to reduce the number of unwanted points within the range data. The computing device may use the range data within the spherical coordinates to determine a 2D format for the information that allows each unit (e.g., pixel) within the 2D format to correspond to object information as the environment is configured. The computing device may analyze the 2D map information to determine that a pedestrian 502 is standing near the road and in front of a tree 504. The computing device may detect the objects within the 2D map based on elevation information or intensity information. For example, the computing device may be configured to search for typical pedestrian heights within the 2D map of information and/or may use the intensity information to determine that objects may include skin or clothing materials. The computing device may identify the pedestrian 502 from the tree 504 using distance information, intensity information, and/or elevation information and in response, properly avoid the pedestrian 502.

Figure 6:
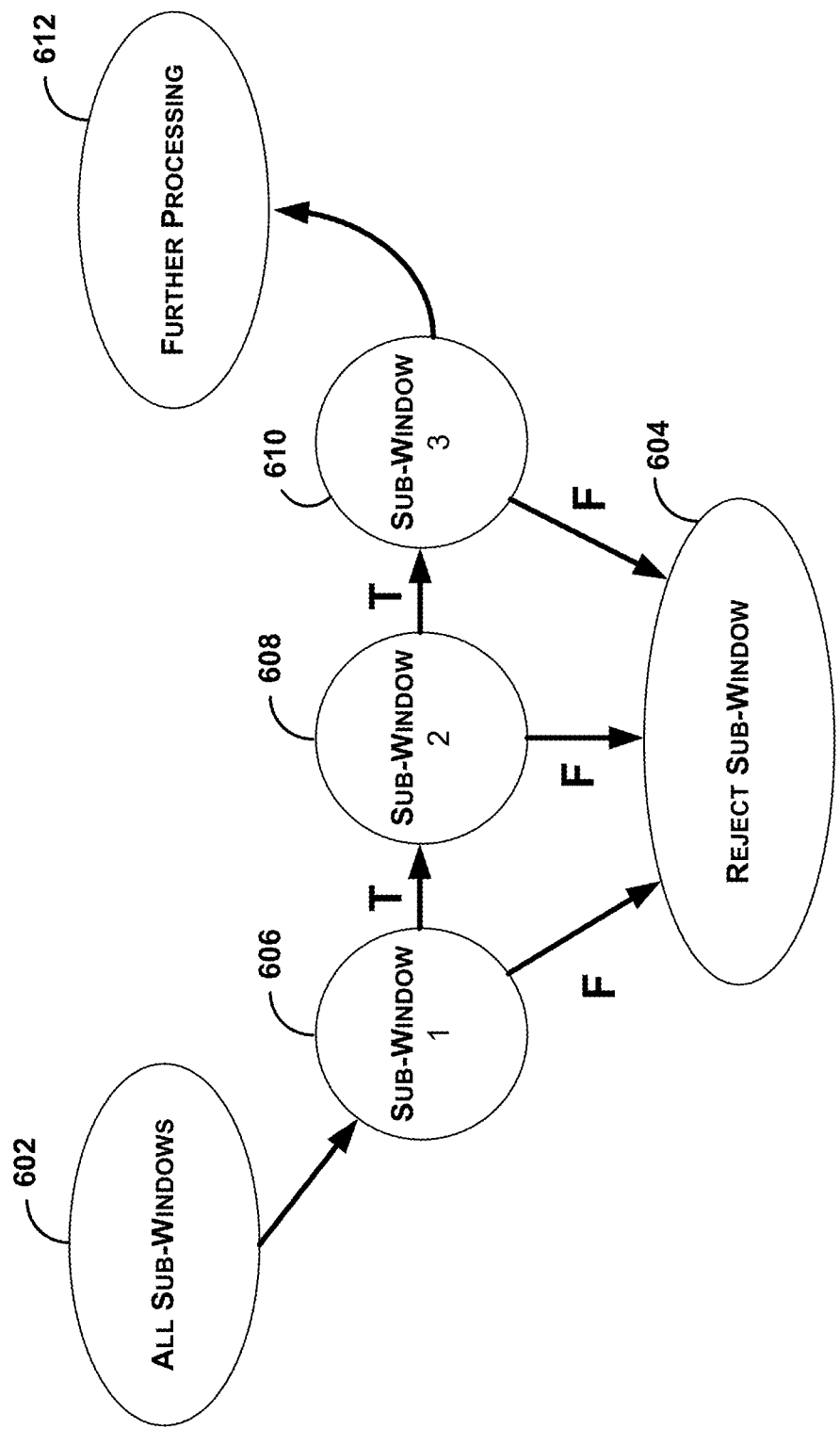
FIG. 6 illustrates an example implementation of a sliding window scan process.

FIG. 6 illustrates an example flow diagram for executing a two-dimensional sliding window scan process 600. The example sliding window scan process includes example features 602-612, but may include more or less steps in other implementations. A vehicle's computing system may be configured to perform sliding window processes similar, such as sliding window scan process 600, or similar processes (e.g., Viola-Jones object detection framework). Executing a sliding window scan process may enable a computing system to analyze and identify data points that may be indicative of a pedestrian within the environment of the vehicle. The sliding window scan may be executed in any dimension, including analyzing 2D images that provide elevation, intensity, and/or range information to a computing system.

In particular, the example sliding window scan process may include feature 602, which illustrates an initial potential analysis step for all or part of the sub-windows that make up the 2D map image configured by a vehicle's computing system using sensor information. As previously discussed, a vehicle's computing system may be configured to format the LIDAR information into the 2D image or map format for analysis and may divide the 2D image into a series of sub-windows for detecting objects. Within examples, the size of the sub-windows may vary, such that a computing system may focus upon small ranges of the information contained in the 2D images.

Rather than analyzing the LIDAR information in a complete 2D image format, a computing system may analyze the sub-windows to focus upon smaller portions of the 2D image in a sliding window process. For example, a classifier may analyze sub-windows in order of complexity or another order. A computing system may apply a learning algorithm in order to analyze a featured captured 2D image of LIDAR information.

When scanning the 2D image format for pedestrians, the computing system may reject the sub-windows after determining that a respective sub-window does not include data points indicative of a pedestrian. The feature 604 represents a portion of the process that may involve the computing system rejecting unwanted sub-windows for failure to include data points indicative of a pedestrian or another object that the computing system may be searching for. For example, the computing system may analyze individual sub-windows, such as the sub-windows shown in features 606-610. After analyzing an individual sub-window, the computing system may determine whether the respective sub-window should be rejected as shown by feature 604, or whether the sub-window should be further processed as shown in feature 612. The different sub-windows may vary in size and may require different amounts of time and/or processing power to analyze. In addition, a computing system and/or classifier may analyze a sub-window multiple iterations in order to further identify data points indicative of a particular object and/or pedestrian. After determining that a sub-window may contain data points indicative of a pedestrian in the environment, the computing system may perform further processing as shown in feature 612.

Figure 7:
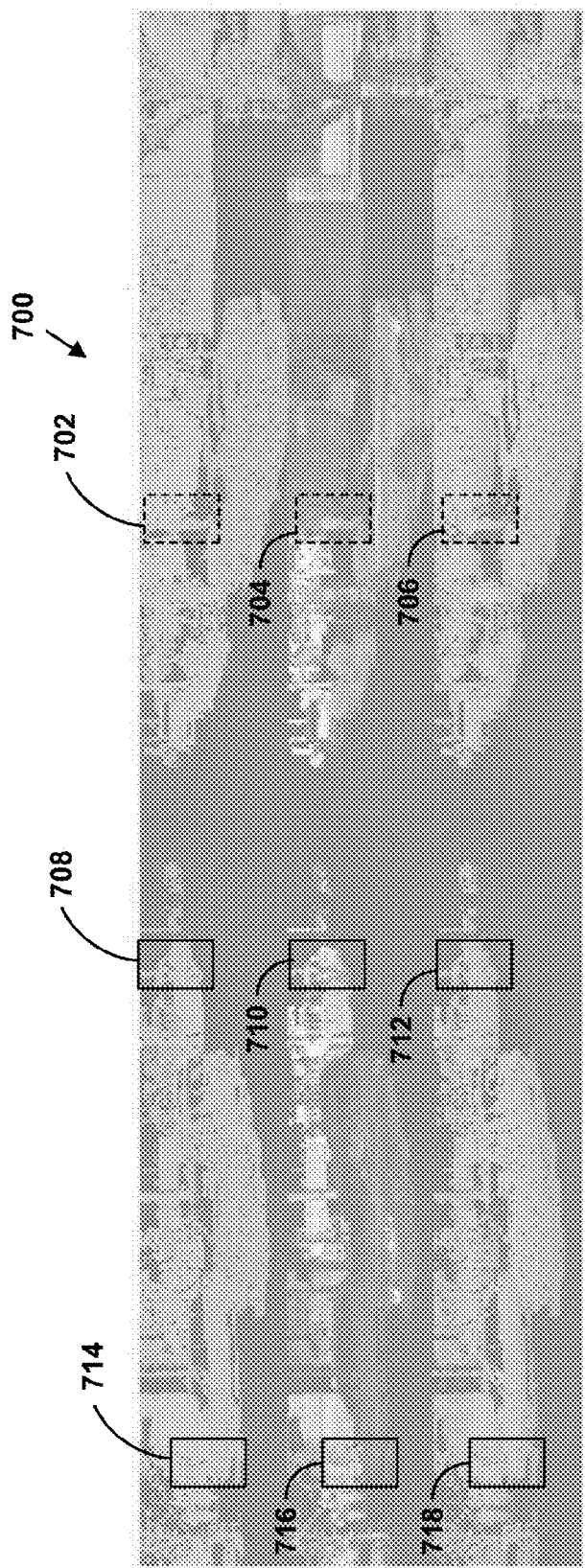
FIG. 7 illustrates an example 2D map that includes sensor information corresponding to the environment of a vehicle.

FIG. 7 illustrates an example 2D map that includes sensor information corresponding to the environment of a vehicle. In particular, a vehicle's computing system may receive information from vehicle sensors (e.g., LIDAR) and project the information into spherical coordinates or another format. After projecting the information into spherical coordinates, the computing system may configure the information a 2D map image 700 as shown in FIG. 7 based on the LIDAR information in the spherical coordinates.

In the illustration, the 2D map image is arranged in three horizontal images of the same environment stacked on top of each other. Each horizontal image may correspond to different information captured by the LIDAR unit. For example, the top horizontal image may be indicative of intensity information captured by the LIDAR unit. Likewise, the top horizontal image may correspond to range information and/or elevation information captured by the LIDAR unit. Further, the other horizontal images may correspond to elevation, range, and/or intensity information and may also include information based on different colors, not shown within the example images of FIG. 7.

As shown by FIG. 7, each horizontal image corresponds to the same environment of the vehicle, but may provide different information. The different horizontal images shown within the 2D map format may include more or less data points, for example. Further, in some implementations, the 2D map may include more or less horizontal images corresponding to the environment. Similarly, the 2D map may arrange the images in a vertical format and/or some other useful format.

The example 2D map displays images that include data points corresponding to the environment. The various data points may correspond to information indicative of objects, such as vehicles, signs, and other objects in the vehicle's environment. In addition, the 2D map may include data points corresponding to pedestrians. A computing system may analyze the 2D map to detect and identify data points corresponding to pedestrians and/or other objects. For example, the computing system may detect data points within boxes 702-706 that correspond to a pedestrian within the environment of the vehicle. The computing system may use a sliding window scan and/or other techniques to locate the data points in the 2D images that may correspond to a pedestrian based on the information provided by the image (e.g., range, intensity, and/or elevation information).

The boxes 702-706 represent possible detections that a computing system may make that correspond to identifying a pedestrian within the 2D image information. Likewise, the computing system may identify data points within boxes 708-718 as possibly corresponding to pedestrians. However, upon further analysis, the computing system may recognize that the data points within boxes 708-718 do not correspond to pedestrians. For example, the computing system may analyze the data points within the boxes 708-718 further to determine that the information (e.g., range, intensity, and/or elevation information) do not correspond to pedestrians. The computing system may further analyze portions of the 2D image to recognize other objects and to determine whether or not the detected data points that may initially correspond to a pedestrian actually correspond to pedestrians in the environment of the vehicle.

The computing system may use various techniques to analyze the information configured into the 2D image format. The computing system may compare data points within the different 2D images since the data points may include different information. For example, the computing system may compare the data points within the elevation information 2D image to the data points within the intensity information 2D image. A computing system may locate and avoid objects utilize information provided by the different images that make up the 2D map format. The different images may be based on information (e.g., range, elevation, and/or intensity information) captured within LIDAR and/or other sensor scans.

FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-4. In some examples, the signal bearing medium 802 may encompass a computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the processor 112 of FIG. 1 may be configured to provide various operations, functions, or actions in response to the programming instructions 804 conveyed to the processor 112 by one or more of the computer readable medium 806, the computer recordable medium 808, and/or the communications medium 810.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
receiving, at a computing device from at least one sensor coupled to a vehicle, range data corresponding to a plurality of objects in an environment of the vehicle, wherein the range data comprises a plurality of first data points configured in a three-dimensional point cloud;
responsive to receiving the range data, generating a spherical data set comprising a plurality of second data points, wherein spherical coordinates for each second data point are generated based on a corresponding one of the first plurality of data points; and
determining, by the computing device associated with the vehicle, a two-dimensional map based on the spherical data set comprising the plurality of second data points, wherein the two-dimensional map comprises a plurality of pixels, wherein each pixel of the plurality of pixels is indicative of a plurality of parameters including elevation information, intensity information, and distances from the vehicle corresponding to the plurality of objects in the environment.

2. The method of claim 1, wherein the plurality of parameters corresponding to the plurality of objects in the environment comprises range information corresponding to the plurality of objects in the environment.

3. The method of claim 1, further comprising:
based on the two-dimensional map, determining whether or not one or more pixels of the plurality of pixels is indicative of a plurality of parameters corresponding to a pedestrian.

4. The method of claim 1, further comprising:
determining whether or not a predefined pattern exists within the two-dimensional map, wherein the predefined pattern is indicative of an object.

5. The method of claim 4, wherein determining whether or not a predefined pattern exists within the two-dimensional map comprises:
using a predefined pattern indicative of a pedestrian; and
based on whether or not the predefined pattern indicative of a pedestrian exists within the two-dimensional map, identifying a pedestrian.

6. The method of claim 3, wherein determining whether or not one or more pixels of the plurality of pixels is indicative of a plurality of parameters corresponding to a pedestrian comprises analyzing the two-dimensional map based on a set of predefined values for the plurality of parameters and the distance between each pixel in the plurality of pixels.

7. The method of claim 1, further comprising:
based on the two-dimensional map, determining whether or not one or more pixels of the of pixels is indicative of a plurality of parameters corresponding to a pedestrian via a sliding window scan.

8. The method of claim 1, wherein generating a spherical data set comprising a plurality of second data points comprises removing any data points that do not comprise an elevation above a predefined threshold based on an elevation map.

9. An autonomous-vehicle system comprising:
one or more sensors;
a computer system associated with a vehicle configured to:
receive, from at least one sensor, range data corresponding to a plurality of objects in an environment of the vehicle, wherein the range data comprises a plurality of first data points configured in a three-dimensional point cloud;
responsive to receiving the range data, generate a spherical data set comprising a plurality of second data points, wherein spherical coordinates for each second data point are generated based on a corresponding one of the first plurality of data points; and
determine a two-dimensional map based on generating the spherical data set comprising the plurality of second data points, wherein the two-dimensional map comprises a plurality of pixels, wherein each pixel of the plurality of pixels is indicative of a plurality of parameters including elevation information, intensity information, and distances from the vehicle corresponding to the plurality of objects in the environment.

10. The system of claim 9, wherein the plurality of parameters corresponding to the plurality of objects in the environment comprises range information corresponding to the plurality of objects in the environment.

11. The system of claim 9, further comprising:
based on the two-dimensional map, determine whether or not one or more pixels of the plurality of pixels is indicative of a plurality of parameters corresponding to a pedestrian.

12. The system of claim 9, further comprising:
based on the two-dimensional map, determine whether or not one or more pixels of the of pixels is indicative of a plurality of parameters corresponding to a pedestrian via a sliding window scan.

13. The non-transitory computer-readable medium of claim 12, wherein the instructions further comprise:
instructions for, based on the two-dimensional map, determining whether or not one or more pixels of the plurality of pixels is indicative of a plurality of parameters corresponding to a pedestrian via a sliding window scan.

14. A non-transitory computer-readable medium having program instructions stored thereon that are executable by at least one processor, the program instructions comprising:
instructions for receiving, at a computing device from at least one sensor coupled to a vehicle, range data corresponding to a plurality of objects in an environment of the vehicle, wherein the range data comprises a plurality of first data points configured in a three-dimensional point cloud;
instructions for generating, responsive to receiving the range data, a spherical data set comprising a plurality of second data points, wherein spherical coordinates for each second data point are generated based on a corresponding one of the first plurality of data points; and
instructions for determining a two-dimensional map based on generating the spherical data set comprising the plurality of second data points, wherein the two-dimensional map comprises a plurality of pixels, wherein each pixel of the plurality of pixels is indicative of a plurality of parameters including elevation information, intensity information, and distances from the vehicle corresponding to the plurality of objects in the environment.

* * * * *